United States Patent
Larson et al.

(10) Patent No.: US 7,516,502 B1
(45) Date of Patent: Apr. 14, 2009

(54) WHEELED ATTACHMENT SYSTEM FOR SPINE BOARDS

(76) Inventors: Donald O. Larson, Box 223, Audubon, MN (US) 56511; Kasey P. Larson, 304 Homestead St., Detroit Lakes, MN (US) 56501

( * ) Notice: Subject to any disclaimer, the term of this patent is extended or adjusted under 35 U.S.C. 154(b) by 81 days.

(21) Appl. No.: 11/852,793

(22) Filed: Sep. 10, 2007

(51) Int. Cl.
*A61G 1/02* (2006.01)
*A61G 1/04* (2006.01)
*B62B 1/00* (2006.01)

(52) U.S. Cl. ............. 5/626; 280/5.26; 280/47.131; 280/79.7

(58) Field of Classification Search ............ 5/625–627, 5/658, 503.1, 620; 296/20; 280/47.131, 280/5.26, 79.11, 79.3, 47.331, 79.7
See application file for complete search history.

(56) References Cited

U.S. PATENT DOCUMENTS

| | | | |
|---|---|---|---|
| 3,337,171 A * | 8/1967 | Canning | 248/165 |
| 4,264,082 A * | 4/1981 | Fouchey, Jr. | 280/5.26 |
| 4,327,933 A * | 5/1982 | Tuggle | 280/414.2 |
| 4,369,982 A | 1/1983 | Hein et al. | |
| 5,179,746 A | 1/1993 | Rogers | |
| 5,868,403 A | 2/1999 | Culp et al. | |
| 5,871,220 A * | 2/1999 | Lombard | 280/79.7 |
| 5,934,282 A | 8/1999 | Young, III et al. | |
| 6,357,063 B1 | 3/2002 | Selby | |
| 6,698,811 B1 | 3/2004 | Schuchman | |
| 6,845,533 B1 | 1/2005 | Tulette | |
| 7,032,910 B2 * | 4/2006 | Joie et al. | 280/47.131 |
| 7,124,454 B2 | 10/2006 | Walkingshaw | |
| 7,296,816 B2 * | 11/2007 | Wilnau | 280/414.2 |

* cited by examiner

*Primary Examiner*—Alexander Grosz

(57) ABSTRACT

A wheeled attachment system for efficiently attaching to a spine board to allow the spine board to be easily maneuvered over various surfaces (e.g. flat surfaces, stairs, etc.). The wheeled attachment system generally includes a support structure including a shaft, a plurality of wheels and at least one support, wherein at least three of the plurality of wheels are rotatably attached at each opposing end of the shaft and wherein the plurality of wheels form a tri-wheeled structure upon each of the opposing ends of the shaft. The support extends outwardly from the shaft between the opposing ends of the shaft, wherein the support stabilizes the support structure upon an object positioned adjacent the support structure. An attachment structure extends from the support structure, wherein the attachment structure removably secures the attachment structure and the support structure to the object.

16 Claims, 7 Drawing Sheets

WHEELED ATTACHMENT SYSTEM FOR SPINE BOARDS

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to spine boards and more specifically it relates to a wheeled attachment system for efficiently attaching to a spine board to allow the spine board to be easily maneuvered over various surfaces (e.g. flat surfaces, stairs, etc.).

2. Description of the Related Art

Any discussion of the related art throughout the specification should in no way be considered as an admission that such related art is widely known or forms part of common general knowledge in the field.

Spine boards have been in use for years within various fields (e.g. medical, etc.). Spine boards are typically utilized for the immobilization and transportation of patients with suspected neck or spinal injuries. Spine boards are also typically comprised of a hard material, such as wood or plastic to prevent the board from bending while utilizing the present invention.

It is generally necessary when utilizing spine boards for at least two people to carry the board and patient upon the board. When carrying the patient and spine board in hard to maneuver places, such as stairs, one person generally has to walk backward while carrying their end of the board. This can be hazardous for the patient along with the individual carrying the board.

Attempts have been made to attach wheels to an end of the board; however while the wheels may provide easy transportation among flat surfaces they generally are not efficiently maneuverable among stairs. Because of the inherent problems with the related art, there is a need for a new and improved wheeled attachment system for efficiently attaching to a spine board to allow the spine board to be easily maneuvered over various surfaces (e.g. flat surfaces, stairs, etc.).

BRIEF SUMMARY OF THE INVENTION

The general purpose of the present invention is to provide a wheeled attachment system that has many of the advantages of the spine boards mentioned heretofore. The invention generally relates to a spine board which includes a support structure including a shaft, a plurality of wheels and at least one support, wherein at least three of the plurality of wheels are rotatably attached at each opposing end of the shaft and wherein the plurality of wheels form a tri-wheeled structure upon each of the opposing ends of the shaft. The support extends outwardly from the shaft between the opposing ends of the shaft, wherein the support stabilizes the support structure upon an object positioned adjacent the support structure. An attachment structure extends from the support structure, wherein the attachment structure removably secures the attachment structure and the support structure to the object.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a wheeled attachment system for efficiently attaching to a spine board to allow the spine board to be easily maneuvered over various surfaces (e.g. flat surfaces, stairs, etc.).

Another object is to provide a wheeled attachment system that attaches on various configurations and sizes of spine boards.

A further object is to provide a wheeled attachment system that includes a tri-wheeled structure to allow the attached spine board to be smoothly maneuvered down or up a flight of stairs.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
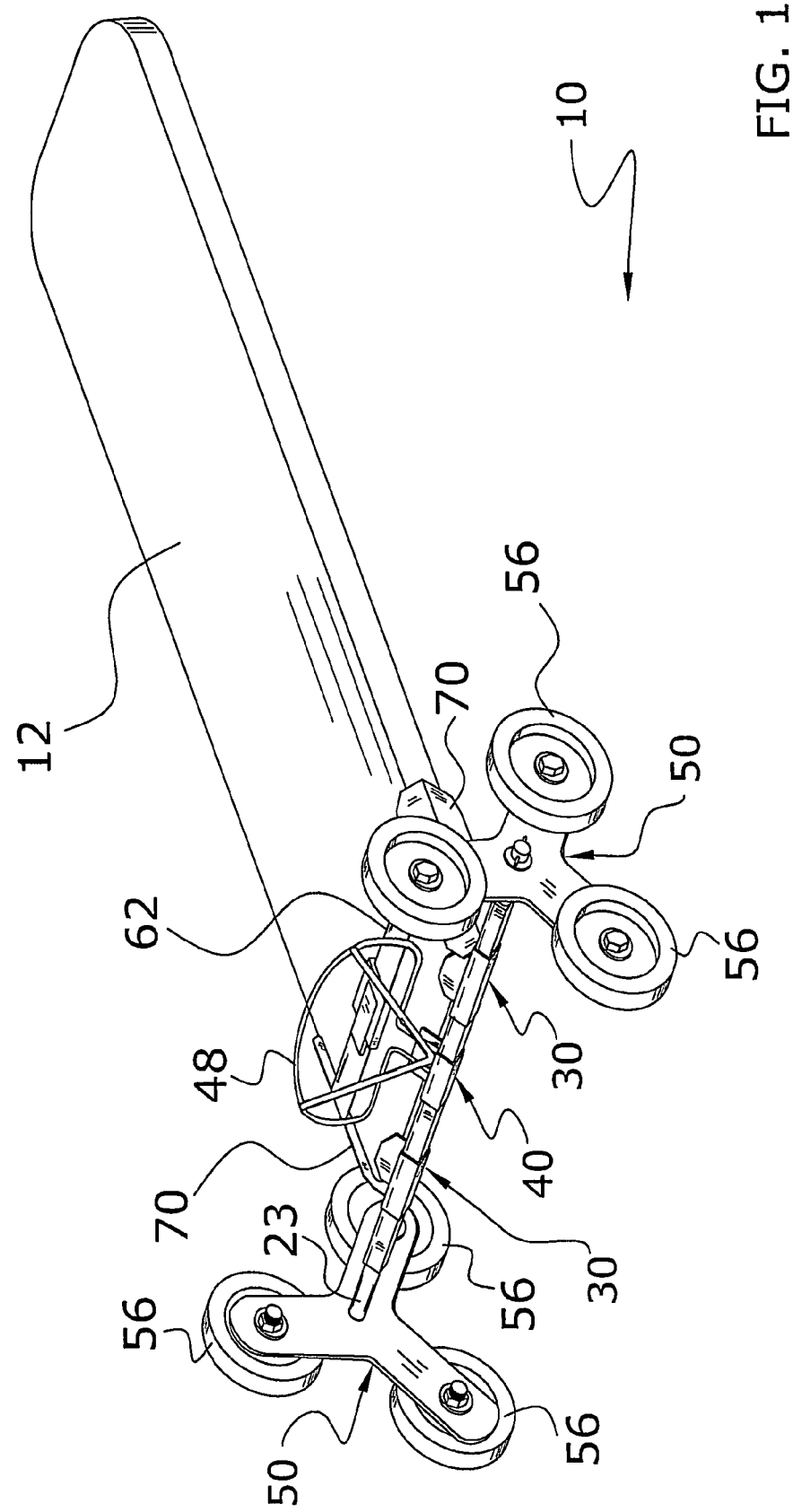
FIG. 1 is an upper perspective view of the present invention attached to a spine board.

Turning now descriptively to the drawings, in which similar reference characters denote similar elements throughout the several views, FIGS. 1 through 7 illustrate a wheeled attachment system 10, which comprises a support structure 20 including a shaft 22, a plurality of wheels 56 and at least one support 30, 40, wherein at least three of the plurality of wheels 56 are rotatably attached at each opposing end of the shaft 22 and wherein the plurality of wheels 56 form a tri-wheeled structure upon each of the opposing ends of the shaft 22. The support 30, 40 extends outwardly from the shaft 22 between the opposing ends of the shaft 22, wherein the support 30, 40 stabilizes the support structure 20 upon an object 12 (e.g. spine board, etc.) positioned adjacent the support structure 20. An attachment structure 60 extends from the support structure 20, wherein the attachment structure 60 removably secures the attachment structure 60 and the support structure 20 to the object 12.

B. Spine Board

Figure 2:
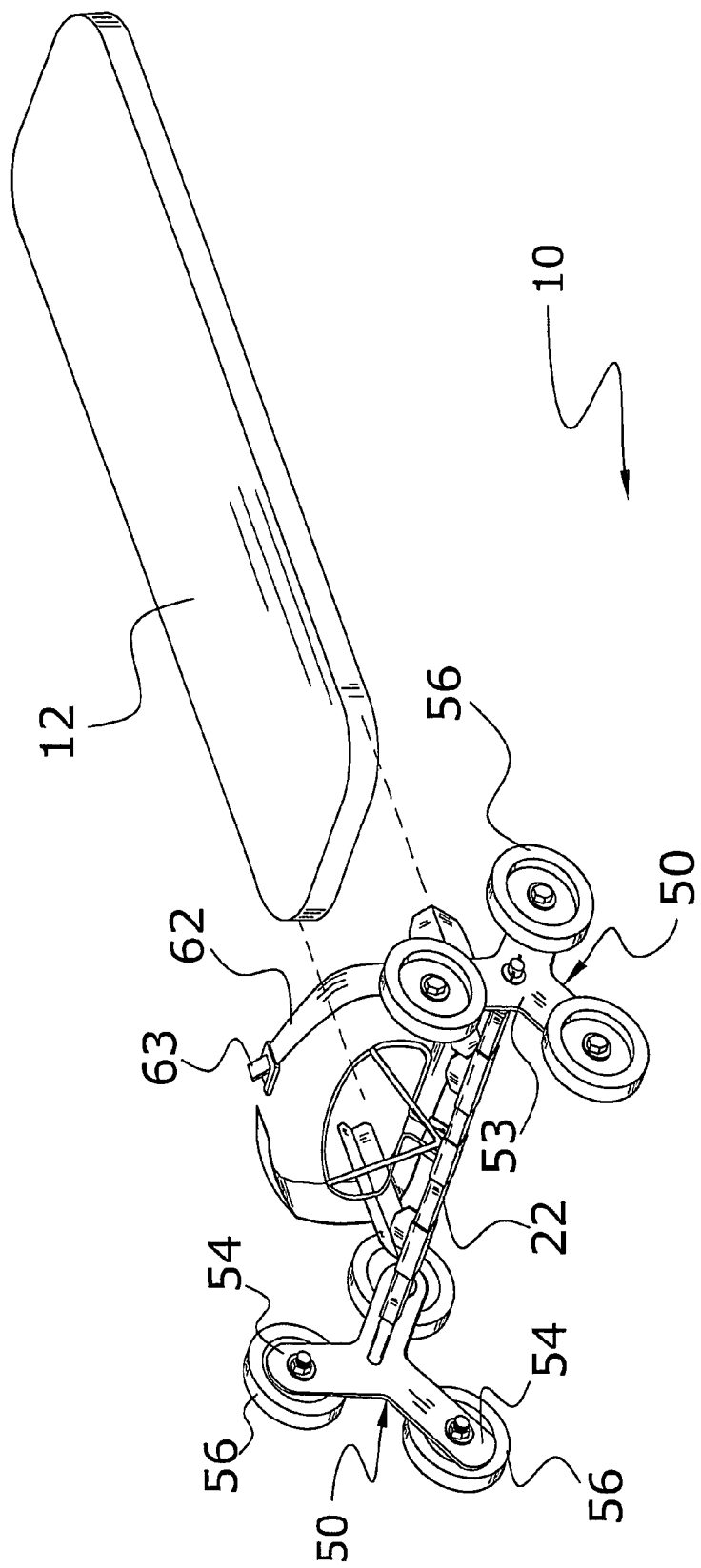
FIG. 2 is an upper perspective view of the present invention exploded from a spine board.

The present invention preferably attaches to an end of a spine board 12 (i.e. backboard) as illustrated in FIGS. 1 and 2. The spine board 12 is generally comprised of a rigid and durable structure and material, such as wood or plastic. The spine board 12 is also generally substantially rectangular in shape and of a size to accommodate an individual (i.e. patient) lying upon the spine board 12 (e.g. 5-7 feet in length, 9-18 inches in width, etc.).

The present invention further preferably attaches to the end of the spine board 12 where the patient's feet are or will be positioned and the patient may rest their feet upon the footrest 48 of the present invention. It is appreciated that the present invention may attach to various other structures and apparatuses rather than a spine board 12 all which are desired to be easily maneuvered via rolling the structure or apparatus upon a surface (e.g. flat surface, flight of stairs 19, etc.).

C. Support Structure

The support structure 20 is positioned against the end of the spine board 12 and is secured to the spine board 12 via the attachment structure 60 as illustrated in FIGS. 1 and 2. The support structure 20 supports the spine board 12 above the ground via the plurality of wheels 56 extending from opposing ends of the support structure 20. The support structure 20 is comprised of a durable and strong material capable of withstanding the weight of the patient and the spine board 12 over various surfaces (e.g. flat surfaces, flight of stairs 19, etc.).

i. Shaft

The support structure 20 includes a shaft 22 extending along an entire length of the support structure 20. The shaft 22 includes a pair of outer portions 23 and an inner portion 24 extending between the outer portions 23 as illustrated in FIGS. 1 through 6. The outer portions 23 and the inner portions 24 are preferably integrally formed; however it is appreciated that the outer portions 23 and the inner portion 24 may be comprised of separate structures attached together in some manner (e.g. weldebly, fastened, etc.).

The outer portions 23 are each preferably comprised of a cylindrical shaped configuration so that the hub 50 may efficiently rotate about the outer portions 23 of the shaft 22. Each of the outer portions 23 further extends from a respective opposing end of the inner portion 24. The outer portions 23 further preferably mirror each other about the inner portion 24, wherein the outer portions 23 are comprised of substantially similar configurations. The outer portions 23 may also each include a hole(s) to receive a pin or bolt to securely attach the hub 50 to the respective outer portion 23.

The inner portion 24 extends between the two outer portions 23 as illustrated in FIGS. 1 through 6. The inner portion 24 is preferably comprised of an elongated configuration (e.g. 18 inches, etc.) and further comprised of a square or triangular cross-sectional shaped configuration. The square or triangular cross-sectional configuration allows the outer supports 30 and the center support 40 to efficiently attach to the inner portion 24 without rotating around the inner portion 24, wherein the corners of the square/triangle keep the outer supports 30 and the center support 40 from rotating. It is appreciated however that the inner portion 24 may be comprised of various other configurations rather than the preferred embodiment, all which allow the outer supports 30 and the center support 40 to efficiently attach to the inner portion 24.

The length of the inner portion 24 is preferably substantially similar or slightly greater than the maximum width of the spine board 12. The outer supports 30 may be adjusted about the inner portion 24, wherein the outer supports 30 are positioned at a respective outer side of the spine board 12 while remaining positioned upon the inner portion 24 as illustrated in FIGS. 1 through 6.

ii. Tri-Wheeled Structure

The present invention includes a pair of hubs 50, wherein each hub 50 is positioned upon a respective outer portion 23 of the shaft 22. The hubs 50 may be secured upon the respective outer portion 23 via various methods (e.g. cotter pin, bolt, etc.). The hubs 50 are comprised of substantially similar configurations as illustrated in FIGS. 1 through 7. The hubs 50 also mirror each other about the longitudinal center of the shaft 22.

The hubs 50 each include a center aperture 52 extending through a center portion 53 of the hub 50 and concentric with the hub 50. The center aperture 52 receives the respective outer portion 23 of the shaft 22 to position the hub 50 upon the outer portion 23. The center aperture 52 also allows the hub 50 to spin freely about the outer portion 23, wherein the entire hub 50 is able to spin. The hub 50 may also include a bearing structure adjacent the center portion 53 to allow the hub 50 to spin faster and with greater ease about the outer portion 23.

Figure 7:
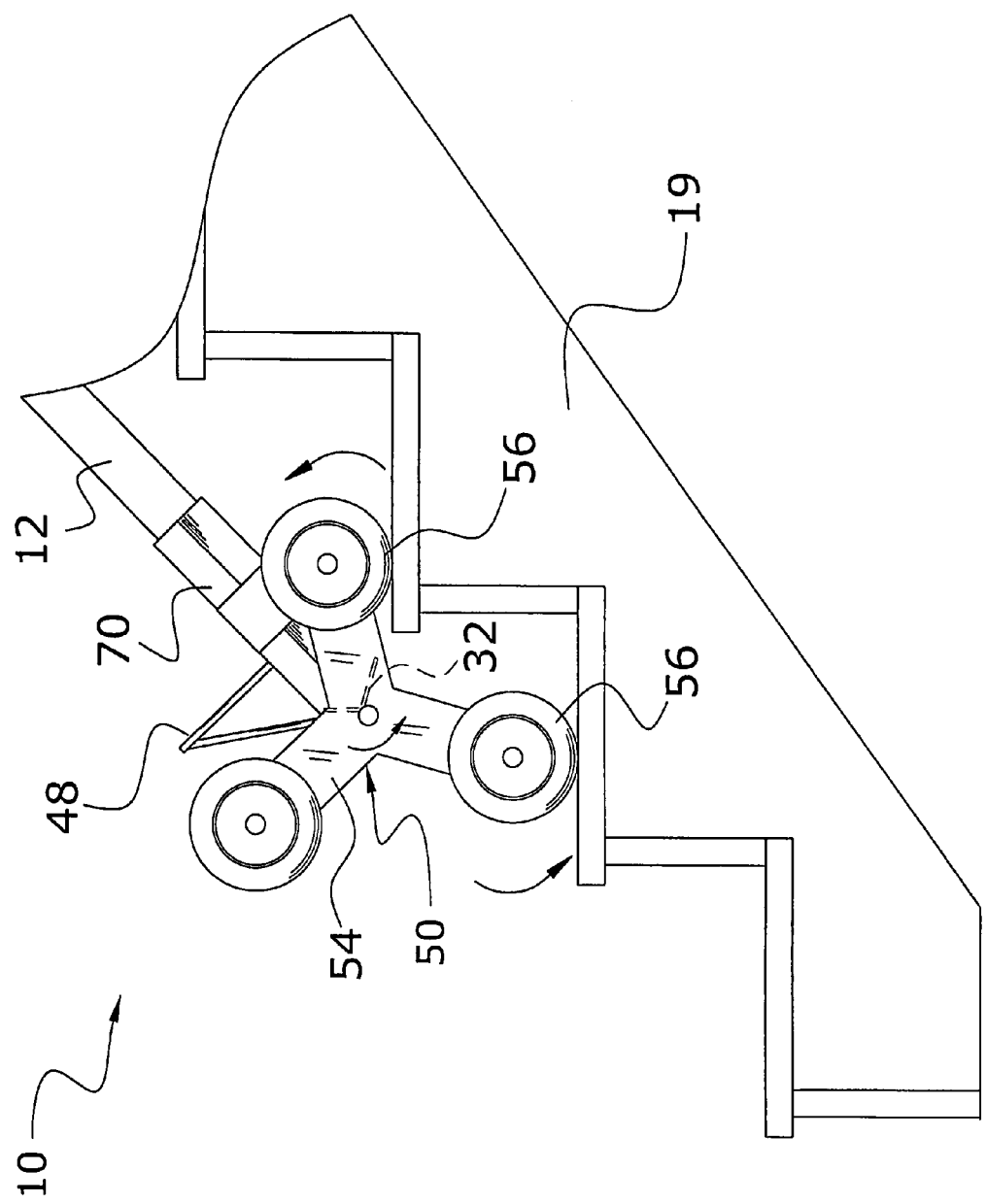
FIG. 7 is a side view of the present invention attached to a spine board and being directed along a flight of stairs.

The hubs 50 are each preferably comprised of a tri-arm configuration as illustrated in FIG. 7, wherein the hubs 50 each preferably include three extending portions 54 extending outwards from the center portion 53 of the hub 50. The extending portions 54 are each preferably equidistantly spaced from one another along an outer perimeter of the center portion 53 and each include a wheel 56 rotatably attached at the distal end of the extending portion 54 from the center portion 53 to form a tri-wheel configuration upon each hub 50.

The wheels 56 are preferably comprised of a rubber or plastic material. The wheels 56 spin freely about the hub 50, wherein the wheels 56 are able to rotate about the hub 50 in addition to the hub 50 rotating about the shaft 22 as illustrated in FIG. 7. The wheels 56 may be attached to the hub 50 in various manners, such as utilizing a bolt or axle and cotter pin. The wheels 56 may also each include a bearing structure attached between the wheels 56 and the extending portion 54 to allow the wheels 56 to spin more easily.

The distance from an uppermost wheel 56 to a lowermost wheel 56 upon each hub 50 is of a length great enough to allow adjacent wheels to stretch from stair to stair along the flight of stairs 19 as illustrated in FIG. 7. This allows the wheels 56 and hub 50 to smoothly rotate when traveling up and down the stairs 19 (i.e. crawl up and down the stairs in a smooth manner), wherein the spine board 12 does not experience any jerky or up and down movement when maneuvering the spine board 12 and attached present invention over the flight of stairs 19.

iii. Outer Supports

Figure 4:
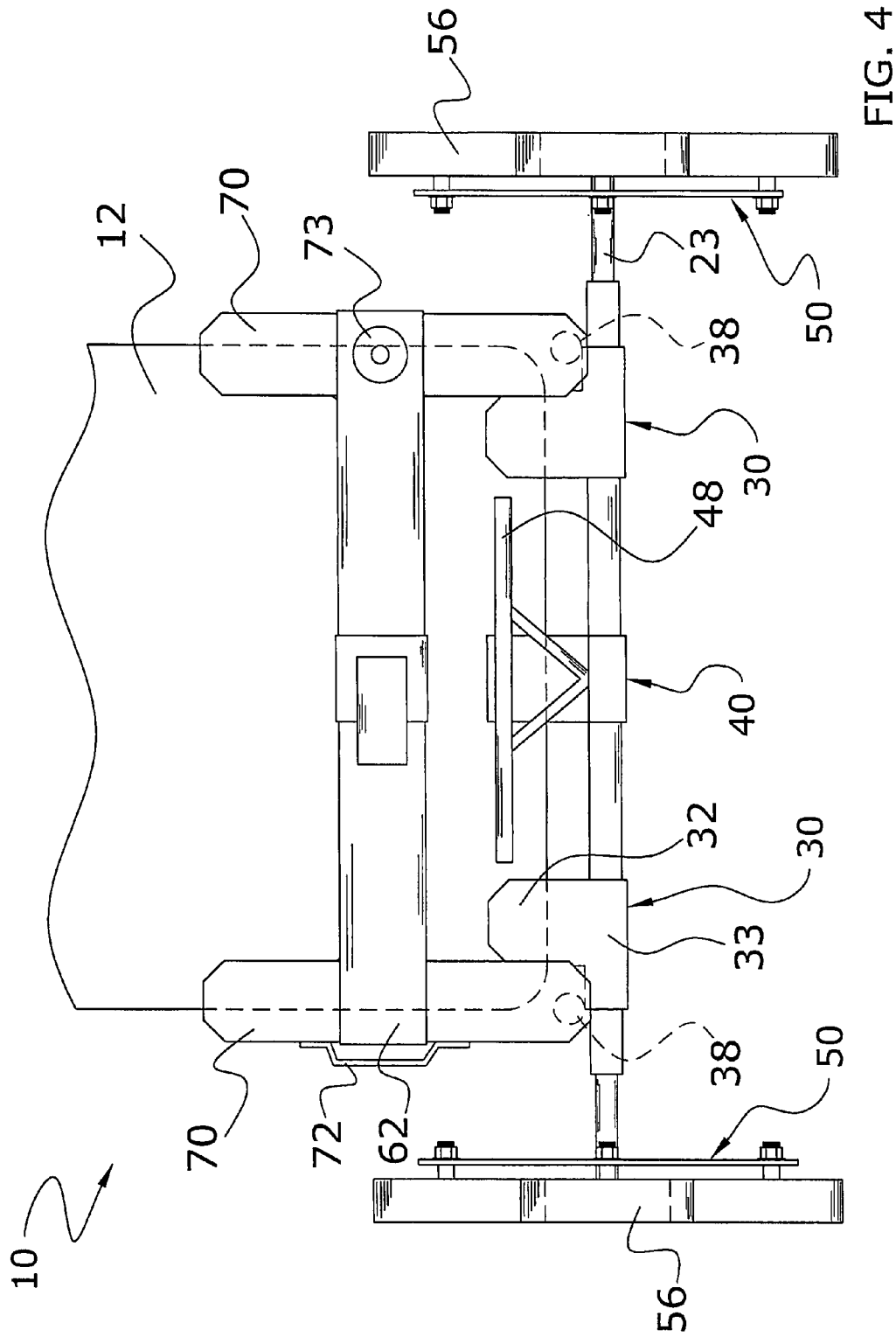
FIG. 4 is a top view of the present invention attached to a spine board.
Figure 5:
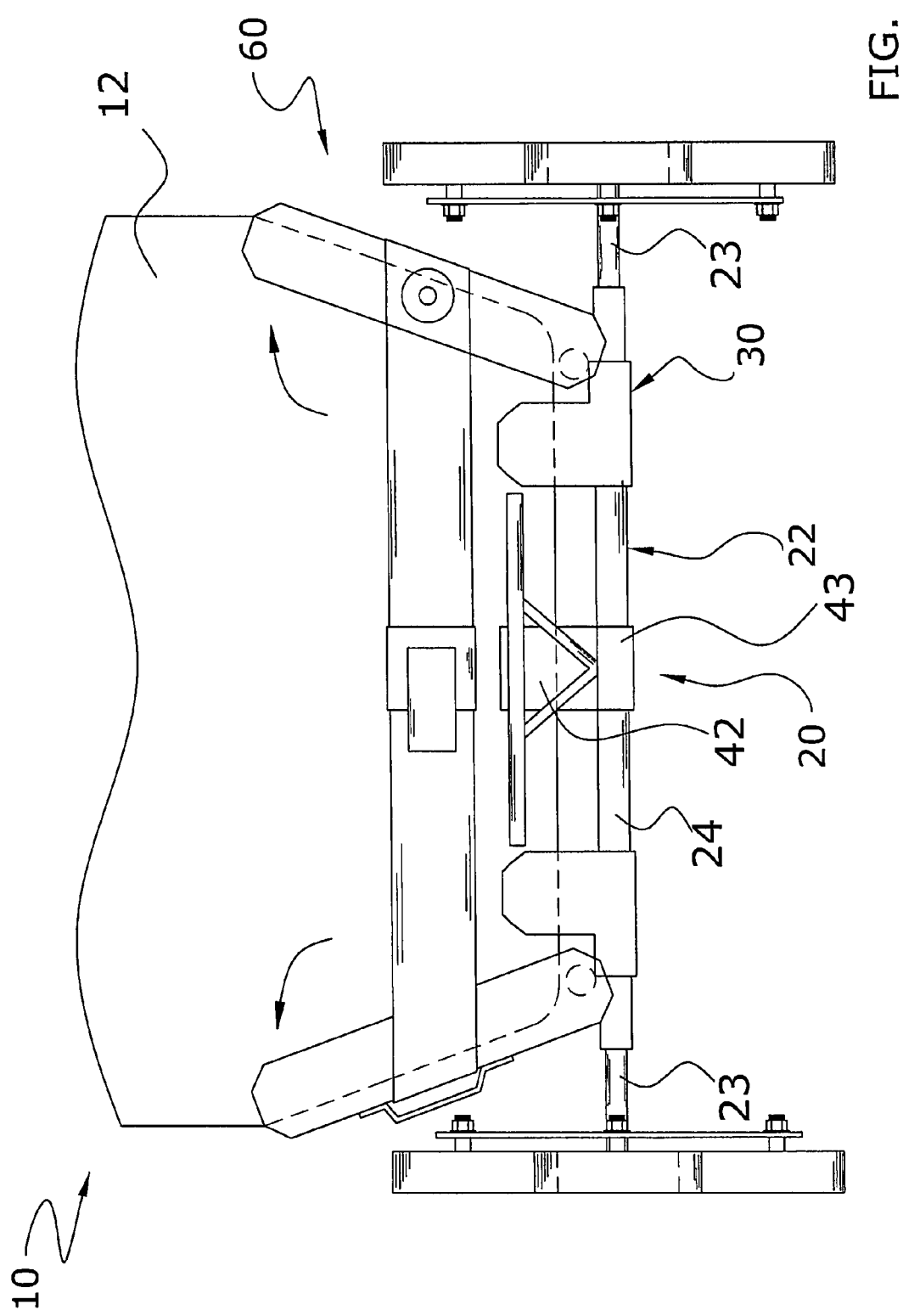
FIG. 5 is a top view of the present invention attached to a spine board, wherein the side supports are pivoted outwards.
Figure 6:
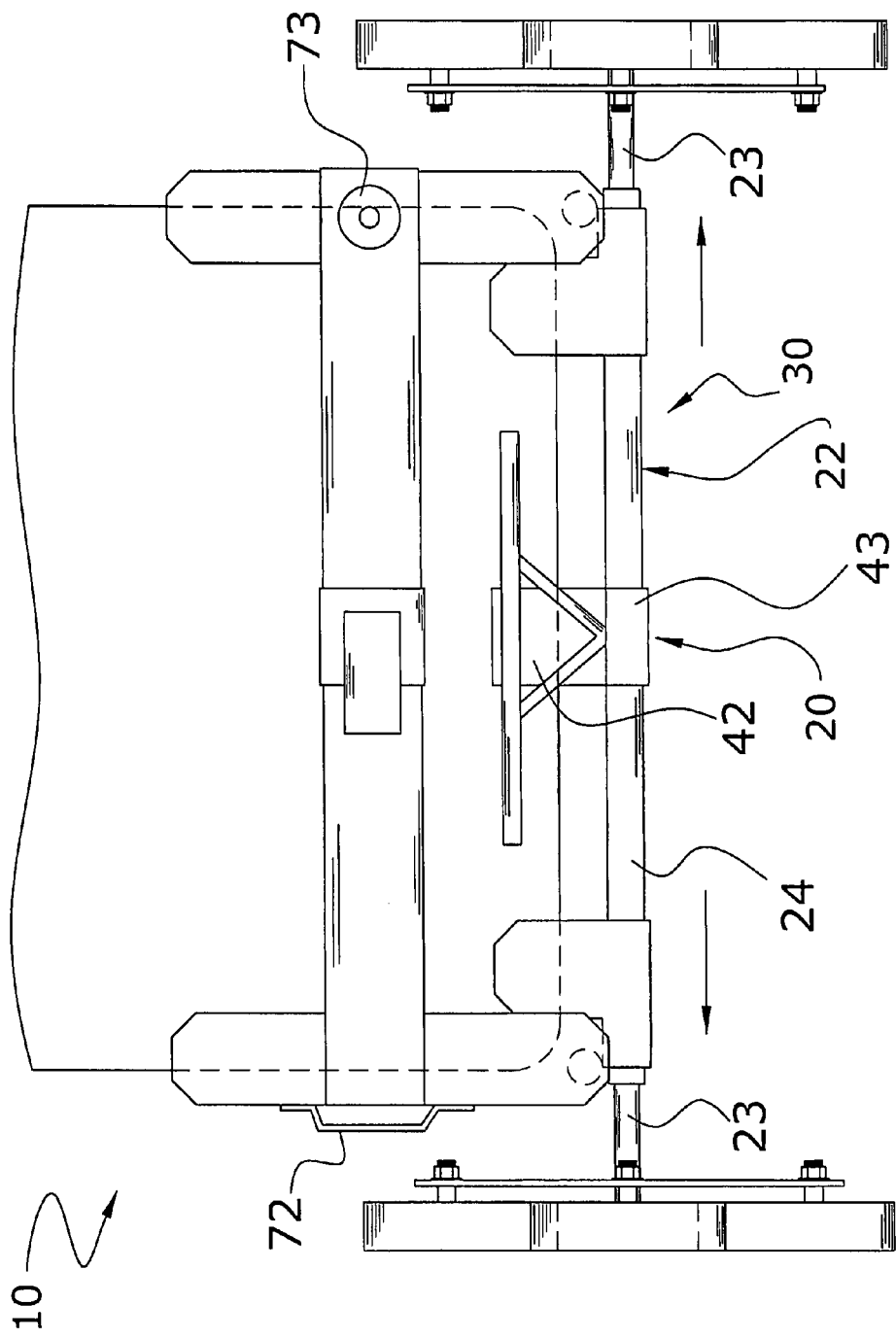
FIG. 6 is a top view of the present invention attached to a spine board, wherein the outer supports are slid outwards.

The outer supports 30 are slidably positioned upon opposing ends of the inner portion 24 of the shaft 22 and are utilized to stabilize the support structure 20 upon the spine board 12 as illustrated in FIGS. 4 and 6. The outer supports 30 are preferably comprised of substantially similar configurations. The outer supports 30 each include an outer retaining portion 32 and an outer sleeve portion 33, wherein the outer retaining portion 32 extends from the outer sleeve portion 33.

The outer sleeve portion 33 is comprised of a hollow configuration and is further comprised of a substantially similar cross-sectional shape and configuration as the inner portion 24. The outer sleeve portion 33 is able to slidably adjust along the inner portion 24 to accommodate for various width spine boards 12. The outer retaining portion 32 is preferably comprised of a V-shaped cross-sectional configuration as illustrated in FIG. 7. The V-shape of the outer retaining portion 32 also is able to accommodate various thicknesses of spine boards 12 (e.g. ¾ inches, 3 inches, etc.). The outer retaining portion 32 receives the end of the spine board 12 within the V-shape of the outer retaining portion 32. It is appreciated that the outer retaining portion 32 may be comprised of various configurations all which adequately receive the end of the spine board 12.

iv. Center Support

The center support 40 is preferably fixedly attached to the longitudinal center of the inner portion 24 of the shaft 22 and is utilized to stabilize the support structure 20 upon the spine board 12 as illustrated in FIGS. 1 through 6. The center support 40 is preferably comprised of substantially similar configuration as the outer support 30, wherein the center support 40 also includes a center sleeve portion 43 and a center retaining portion 42 extending from the sleeve portion 43.

The sleeve portion 43 is comprised of a hollow configuration and is further comprised of a substantially similar cross-sectional shape and configuration as the inner portion 24. The center sleeve portion 43 is preferably fixedly attached to the shaft 22 of the support structure 20. It is appreciated that the center retaining portion 42 may directly extend from the inner portion 24 rather than utilizing the center sleeve portion 43.

The center retaining portion 42 is preferably comprised of a V-shaped cross-sectional configuration similar to the outer retaining portions 32. The retaining portion 42 receives the end of the spine board 12 within the V-shape of the retaining portion 42. The V-shape of the center retaining portion 42 also is able to accommodate various thicknesses of spine boards 12 (e.g. ¾ inches, 3 inches, etc.). It is appreciated that the retaining portion 42 may be comprised of various configurations all which adequately receive the end of the spine board 12.

Figure 3:
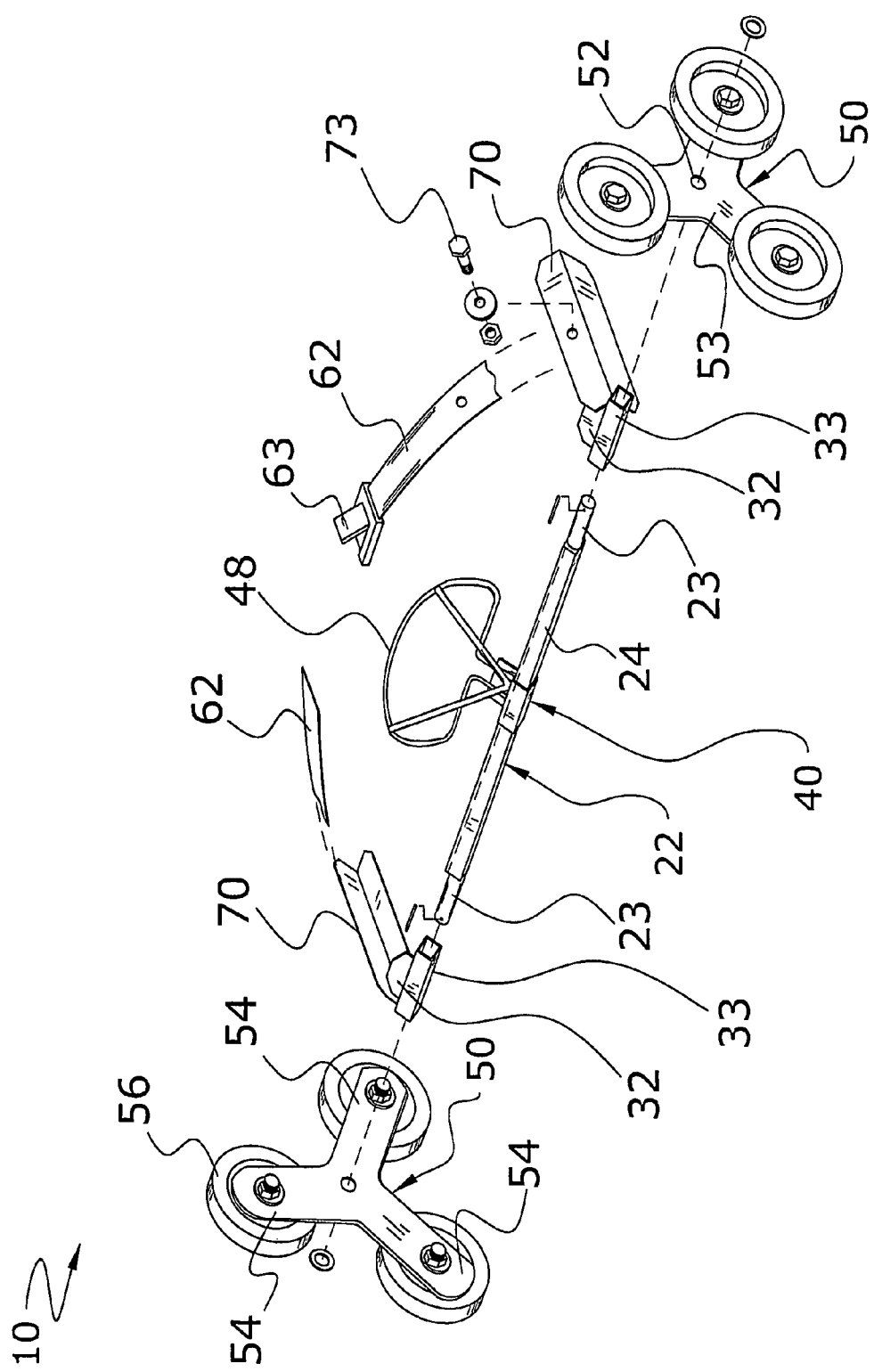
FIG. 3 is an exploded upper perspective view of the present invention.

The center support 40 also preferably includes a footrest 48 extending from the upper end of the center retaining portion 42 or the upper end of the center sleeve portion 43 and towards the spine board 12. The footrest 48 preferably extends at an upward angle as illustrated in FIGS. 1 through 3. The footrest 48 may include various cross members or be comprised of various configurations, all which allow a patient 17 to comfortably and efficiently position their feet against the footrest 48. It is appreciated that the footrest 48 may also serve various other purposes, such as a handle.

D. Attachment Structure

The attachment structure 60 extends from the support structure 20 and secures the support structure 20 to the spine board 12 as illustrated in FIGS. 1 and 2. The attachment structure 60 is comprised of a durable and strong material capable of withstanding the weight of the spine board 12 and patient and also holding the support structure 20 upon the spine board 12.

i. Side Supports

The attachment structure 60 includes a pair of side supports 70, wherein each side support 70 extends from a respective outer support 30 of the support structure 20 and is positioned along the sides of the spine board 12 adjacent the end of the spine board 12 as illustrated in FIGS. 1 and 2. The side supports 70 are preferably pivotally (via a hinge structure 38) attached to the outer supports 30 to allow the side supports 70 to extend along various angled sides of various spine boards 12 (e.g. sides of spine board 12 define a 90 degree angle with end of spine board 12, sides of spine board 12 define a 45 degree angle with end of spine board 12, etc.).

The hinge structure 38 may be comprised of various configurations, such as but not limited to a pin, a hinge or various other mechanisms that allow the side supports 70 to pivot about the outer supports 30. The side supports 70 are also selectively perpendicular to the outer supports 30. It is appreciated that the side supports 70 may define various other angles with the outer supports 30 when pivoted about the outer supports 30 (e.g. 45 degree angle, etc.).

The side supports 70 are preferably comprised of an elongated configuration and further preferably are comprised of a V-shaped cross-sectional shape. The V-shape of the side supports 70 is able to accommodate various thicknesses of spine boards 12 (e.g. ¾ inches, 3 inches, etc.). Each side support 70 preferably faces the opposing side support 70, wherein the spine board 12 is positioned between the two side supports 70. The side supports 70 also preferably include a groove adjacent the outer support 30 to allow the side support 70 to efficiently pivot about the outer support 30 without engaging the outer support 30. The corners of the side supports 70, the center support 40 and the outer supports 30 are also preferably rounded or angled to prevent the patient from cutting or scraping themselves upon the side supports 70, the center support 40 or the outer supports 30.

At least one of the side supports 70 preferably includes a loop member 72 extending along an outer side of the side support 70 to receive the strap 62. The loop member 72 subsequently prevents the strap 62 from sliding off of the side support 70. The opposing side support 70 may also include a second loop member 72 to provide a similar purpose as previously described. In the preferred embodiment, the opposing side support 70 includes a fastener 73 to fixedly secure the strap 62 to the side support 70. The fastener 73 may be comprised of various configurations, such as but not limited to a bolt.

ii. Strap

The strap 62 is comprised of an elongated configuration to efficiently wrap around an outer diameter of the spine board 12 and the side supports 70 as illustrated in FIGS. 1 through 3. The strap 62 is further comprised of a strong and flexible strap 62. The strap 62 secures the side supports 70 tight against the sides of the spine board 12 and thus secures the support structure 20 upon the end of the spine board 12, wherein the support structure 20 is attached to the side supports 70. The strap 62 wraps around the board 12 and over the outer side of the side supports 70 and then is secured upon itself via a buckle 63 or various other structures utilized to secure straps 62 upon objects.

E. Operation of Preferred Embodiment

In use, the strap 62 is first loosened and the side supports 70 are angled in a manner to conform to the sides of the spine board 12 adjacent the end of the spine board 12 that the present invention is to be attached to. The present invention is then positioned upon the end of the spine board 12 ensuring the retaining portions 32, 42 of the center support 40 and outer supports 30 are positioned upon the end of the spine board 12. The outer supports 30 may need to be slidably adjusted so the side supports 70 are positioned tight against each of the sides of the spine board 12. The strap 62 is now ensured to be properly wrapped around the spine board 12 and through the loop member 72 of the side support(s) 70. The strap 62 is now tightened and the buckle 63 fastener thus securing the present invention to the spine board 12.

When utilizing the present invention the wheels 56 are able to freely roll, wherein an operator would push or pull the opposing end of the spine board 12 than the present invention is attached. When pulling or pushing the spine board 12 and attached present invention down the stairs 19, the wheels 56 and the hub 50 freely rotate thus allowing the spine board 12 to crawl down or up the stairs 19 in a smooth manner.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A wheeled attachment system, comprising:
a support structure including a shaft, a plurality of wheels and a pair of spaced apart supports of generally V-shaped cross sectional configuration, positioned slideably on said shaft, wherein said pair of spaced apart supports are slideable relative to each other, wherein at least three of said plurality of wheels are rotatably attached at each opposing end of said shaft;
wherein said plurality of wheels form a tri-wheeled structure upon each of said opposing ends of said shaft;
wherein said supports extend outwardly from said shaft between said opposing ends of said shaft, wherein said at least one support stabilizes said support structure upon a spin board positioned adjacent said support structure; and
an attachment structure extending from said support structure, wherein said attachment structure removably secures said attachment structure and said support structure to said spin board.

2. The wheeled attachment system of claim 1, wherein said tri-wheeled structure includes a hub, wherein said hub includes a center portion and a plurality of extending portions radiating from said center portion.

3. The wheeled attachment system of claim 2, wherein said plurality of extending portions are equidistantly spaced around a perimeter of said center portion.

4. The wheeled attachment system of claim 2, wherein said center portion is rotatably attached to said shaft.

5. The wheeled attachment system of claim 4, wherein said at least one of said plurality of wheels is rotatably attached to each of said plurality of extending portions.

6. The wheeled attachment system of claim 1, wherein said attachment structure is attached to said pair of supports.

7. The wheeled attachment system of claim 6, wherein said attachment structure is pivotally attached to said pair of supports.

8. The wheeled attachment system of claim 1, including a footrest extending outwardly from said shaft.

9. The wheeled attachment system of claim 1, wherein said attachment structure includes a pair of side supports, wherein said pair of side supports are comprised of a V-shaped cross-sectional configuration.

10. The wheeled attachment system of claim 9, wherein said pair of side supports are perpendicular to said shaft.

11. The wheeled attachment system of claim 1, in combination with a spine board.

12. A wheeled attachment system, comprising:
a support structure including a shaft, one or more wheels and a pair of spaced apart supports of generally V-shaped cross sectional configuration, positioned slideably on said shaft, wherein said spaced apart supports are slideable relative to each other, and wherein said one or more wheels is rotatably attached at each opposing end of said shaft;
wherein said supports extend outwardly from said shaft between said opposing ends of said shaft, wherein said supports stabilize said support structure upon a spin board positioned adjacent said support structure; and
an attachment structure including an elongated strap, wherein said attachment structure extends from said support structure;
wherein said elongated strap extends around said spin board positioned between said attachment structure and said support structure and wherein said elongated strap removably secures said attachment structure and said support structure to said spine board.

13. The wheeled attachment system of claim 12, wherein said attachment structure is attached to said pair of outer.

14. The wheeled attachment system of claim 13, wherein said attachment structure is pivotally attached to said outer.

15. The wheeled attachment system of claim 12, wherein at least three of said plurality of wheels are rotatably attached at each said opposing end of said shaft and wherein said plurality of wheels form a tri-wheeled structure upon each of said opposing ends of said shaft.

16. A wheeled attachment system, adapted to be removably attached to a spine board, comprising:
a support structure including a shaft, a plurality of wheels and a pair of outer supports, wherein at least three of said plurality of wheels are rotatably attached at each opposing end of said shaft;
wherein said plurality of wheels form a tri-wheeled structure upon each of said opposing ends of said shaft;
wherein said pair of outer supports extend outwardly from said shaft between said opposing ends of said shaft;
an attachment structure extending from said support structure;

wherein said tri-wheeled structure includes a hub, wherein said hub includes a center portion and a plurality of extending portions radiating from said center portion;

wherein said plurality of extending portions are equidistantly spaced around a perimeter of said center portion and wherein said center portion is rotatably attached to said shaft;

wherein said at least one of said plurality of wheels is rotatably attached to each of said plurality of extending portions;

wherein said pair of outer supports are comprised a V-shaped cross-sectional configuration;

wherein said pair of outer supports are slidably attached to said shaft and wherein said attachment structure is pivotally attached to said pair of outer supports; and a footrest extending outwardly from said shaft;

wherein said attachment structure includes a pair of side supports, wherein said pair of side supports are comprised of a V-shaped cross-sectional configuration;

wherein said attachment structure includes an elongated strap extending from said attachment structure.

* * * * *